(No Model.) 2 Sheets—Sheet 1.
T. B. SLOPER.
MEANS FOR PLUGGING HOLES IN RUBBER FABRICS.
No. 490,369. Patented Jan. 24, 1893.
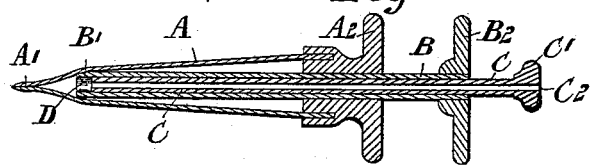
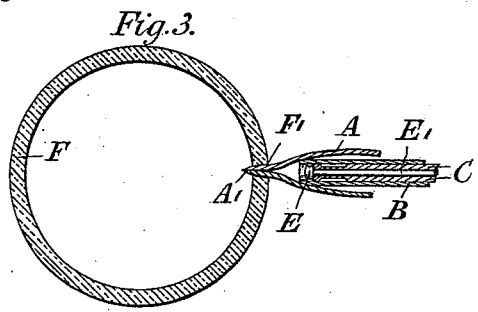
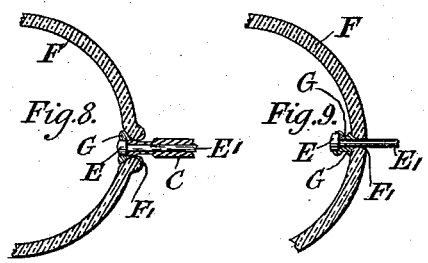
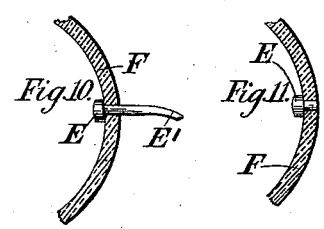
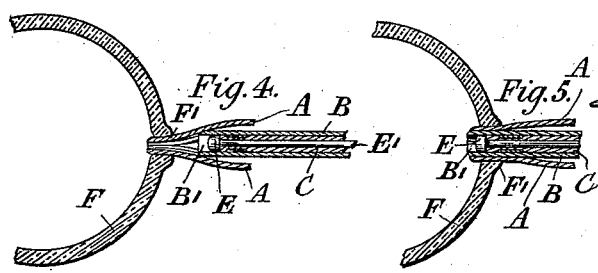
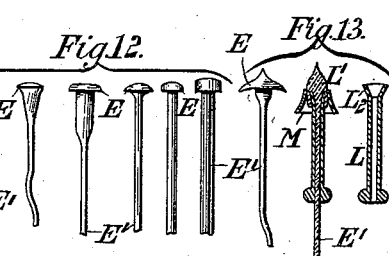
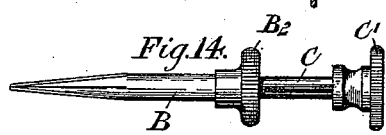
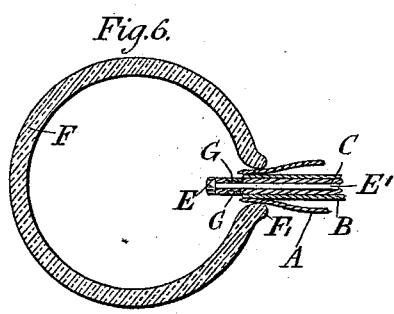
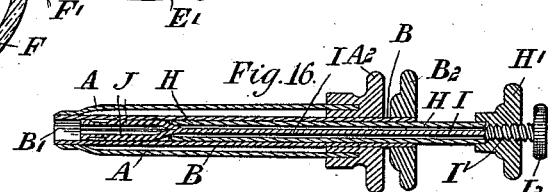
Witnesses
J. M. Fowler Jr
Thomas Durant
Inventor
Thomas B. Sloper,
By Church & Church
His Attorneys
THE NORRIS PETERS CO., PHOTO-LITHO., WASHINGTON, D. C.

(No Model.) 2 Sheets—Sheet 2.
T. B. SLOPER.
MEANS FOR PLUGGING HOLES IN RUBBER FABRICS.
No. 490,369. Patented Jan. 24, 1893.
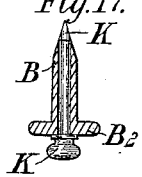
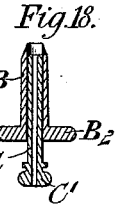
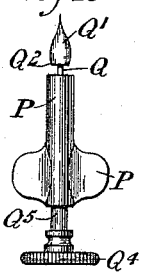
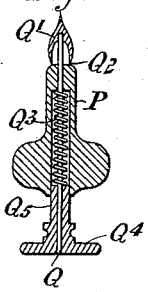
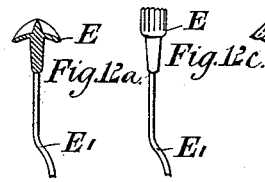
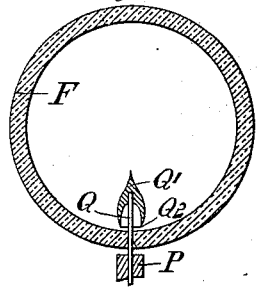
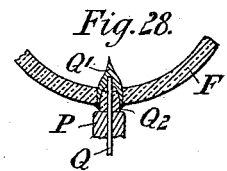
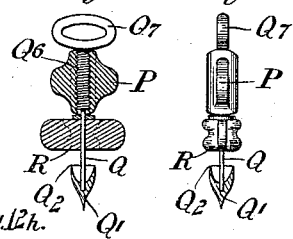
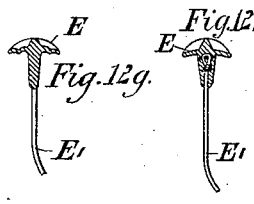
Witnesses
Inventor
Thomas B. Sloper
By Church & Church
His Attorneys

UNITED STATES PATENT OFFICE.

THOMAS BEAVAN SLOPER, OF DEVIZES, ENGLAND.

MEANS FOR PLUGGING HOLES IN RUBBER FABRICS.

SPECIFICATION forming part of Letters Patent No. 490,369, dated January 24, 1893.

Application filed July 25, 1892. Serial No. 441,192. (No model.) Patented in England February 18, 1891, No. 2,919.

*To all whom it may concern:*

Be it known that I, THOMAS BEAVAN SLOPER, a subject of the Queen of England, residing at Devizes, in England, have invented certain new and useful Improvements in or Relating to Stopping Holes in India-Rubber and other Articles, (for which I have obtained Letters Patent in Great Britain, No. 2,919, dated February 18, 1891,) of which the following is a specification.

This my invention relates to the stopping or repairing of holes in articles of indiarubber and other materials and more particularly in articles which cannot be conveniently repaired from the inside such as pneumatic tires of cycles, water-beds and the like.

In carrying out my invention I employ plugs or disks preferably of indiarubber having a stem or branch from the center. These plugs may be made in a form resembling a mushroom and may have threads or fibers extending from and passing up the stem into the substance of the disk.

To repair a hole in the tube of a pneumatic tire I should if necessary enlarge the hole to a little less than the size of the stem of the plug, and by means of a scraper of a convenient form clean the surface of the rubber inside the hole. I should then take a suitably sized plug and insert it together with a little indiarubber solution into a thin tube or holder. This tube may be of any suitable material such as steel or brass and its use is to facilitate the introduction of the plug through the hole which it is to close. After inserting the tube and plug through the hole the plug may be pushed out of the tube by any suitable means. When the tube is withdrawn the plug may be pulled into position from the outside. When the plug is in place the tire may be expanded in the usual manner by means of the air pump, which will cause the plug to retain its position and if desired the projecting stem may be cut off or it may be divided and cemented to the outside The plugs may be made of any suitable form or size and if desired they may be drawn over the outside of a small tube or other device by a ring, jaws or equivalent means instead of being inserted inside a tube. In order to facilitate the insertion of the tube or plug a guide or device to temporarily expand the hole may be employed and may either be separate or may be made to slide on the tube. It will be obvious that in the case of a large hole it may not be necessary to use any other means to assist the insertion of the plug than to roll or tie up the disk allowing the stem or thread to project. Sometimes I make the plug with two disks connected together by the stem and spaced apart about the thickness of the substance to be repaired one disk to be each side of the material.

In the accompanying drawings in all of which the same letters are employed to indicate similar parts I have illustrated means for carrying this invention into effect and the different positions of the parts during the operation.

Figure 1 is a longitudinal section through an instrument suitable for inserting the plug and Fig. 2 shows in section a portion of the instrument removed. Figs. 3 to 11 inclusive illustrate various stages of the operation of inserting the plug and withdrawing the instrument. Fig. 12 shows various forms of plugs, and Figs. $12^a$ to $12^c$, $12^d$, $12^e$, and $12^f$, $12^g$, and $12^h$ and $12^i$, show various other forms of the plug, and Fig. 13 a different form of plug and instrument for inserting it. Figs. 14 and 15 show a modified form of instrument for inserting the plug. The instruments shown in the figures so far are more especially adapted for use with those plugs which have strings to the stems although they may be used for plugs without such strings. Fig. 16 is a longitudinal section of an instrument adapted for use with a plug without a string to the stem. Figs. 17 and 18 show a simplified form of tool adapted for use with a plug with or without a string. Fig. 19 represents a tube adapted for use with a plug having two heads as shown in Fig. 20. Figs. 21 and 22 show another form of inserting tool, and Fig. 23 shows a portion of the same in use. Fig. 24 shows in use an instrument for removing the deposit of sulphur from the inside of the tube around the hole. Figs. 25 to 31 show the tool or instrument for enlarging the puncture by cutting out the piece of rubber containing it. Fig. 25 is an elevation, and Fig. 26 a section of such a tool Figs. 27 and 28 illustrating its operation. Fig. 29 shows the hole when enlarged, and Figs. 30 and 31 show a modification of the tool shown in Figs. 25 and 26.

I will first describe the instrument and process illustrated in Figs. 1 to 12. A, Fig. 1, is a number of spring fingers conveniently six, fixed in a disk or holder $A^2$ and coming together at the point $A'$, B is a tube open at its inner end $B'$ and provided with a head or handle $B^2$. Through the tube B passes the hollow plunger C provided with a head or knob $C'$ and with a hole $C^2$ passing throughout its length. At its inner end the hollow plunger C, Fig. 2, has a peripheral recess $C^3$ which may be filled with indiarubber solution for fixing a plug as will presently appear. In the space D, Fig. 1, between the tube B and the hollow plunger C the head of the plug E is accommodated while being inserted through the tire F.

The use of this instrument will be understood by reference to the drawings. The hollow plunger C is pushed forward into the position relative to the rest of the instrument shown in Fig. 6, and the plug E placed therein with its cord or stem $E'$ passing through the hole $C^2$ and if long enough, out at the head $C'$ as indicated in Fig. 2. The point $A'$ of the instrument formed by the junction of the spring fingers A is inserted as shown in Fig. 3 into the hole in the rubber and pushed entirely through the rubber. The tube B is then forced forward extending the edges of the cut or hole as in Fig. 4 until the position shown in Fig. 5 is reached when the hole is fully expanded and the tube B may be pushed farther through as in Fig. 6 by which time it will be observed the head of the plug E is well inside the rubber tube or sheet to be repaired. The hollow plunger C is retained in this position while the tube B and spring fingers A are drawn back when the position shown in Fig. 7 is reached the edges $F'$ of the puncture or enlarged hole in the tire F taking up the solution G carried in the recess $C^3$ of hollow plunger C as they tightly close into the recess. The hollow plunger C is now drawn back as indicated in Fig. 8 leaving the solution G between the head of the plug E and the edges of the hole; when C has been entirely withdrawn the position is somewhat as shown in Fig. 9, the solution being then between the head of the plug E and the tire F and the edges $F'$ of the hole closely surrounding the stem of the plug which is now pulled out by its stem or cord as indicated in Fig. 10 squeezing out the solution around the head of the plug. The stem of the plug may now be cut off as in Fig. 11, and a perfectly firm joint will be the result the pressure inside the tube merely serving to force the head of the plug more firmly against the interior of the wall of the tube F.

Fig. 12 indicates six different forms of plugs, the first three of which are shown with attenuated stems or cords for a portion of their length, the fourth having a small stem throughout, and the fifth and sixth having thick stems. Figs. $12^a$ $12^b$ and $12^c$ are respectively a longitudinal section, a plan and an elevation of another form of the plug Figs. $12^a$ and $12^b$ showing it open and Fig. $12^c$ folded or compressed as when in the tool ready for being inserted in a hole. This plug has a head concave on its underside and provided with radial ribs on its outer side to prevent the head being turned inside out by the pressure of air. Fig. $12^d$ is a section of a plug having a head concave on its underside and formed of spongy or cellular rubber on its outer side. Figs. $12^e$ and $12^f$ are respectively a longitudinal section and a plan of a plug the head of which is formed with annular ridges on its underside and radial ribs on its upper side. Fig. $12^g$ is a section of a plug the head of which is annularly corrugated and provided with ribs on its outer side. Fig. $12^h$ is a section of a plug in which the cord is attached to a disk of metal or other hard suitable material embedded in said plug the disk as shown in plan in Fig. $12^i$ being provided with preferably two holes. All these are shown broken off and not of their full length.

The instrument shown in Figs. 14 and 15 operates in the same manner as that previously described but is rather simpler the spring fingers A being dispensed with and the tube B being slit and the ends pressed together so as to form the point as in Fig. 14. In use the points would be forced apart just as with the spring fingers A of Fig. 1 by the hollow plunger C.

The instrument shown in Fig. 16 is substantially the same in its operation as Fig. 1 the tube B being shown pressed forward and the spring fingers A expanded; the hollow plunger C however is dispensed with and a tube H with a head $H'$ is substituted and surrounds the spindle I which screws through the head $H'$ at $I'$ and may be turned by the milled head $I^2$. The inner end of the spindle I is split and formed into cylindrical jaws J the external form of which coincides with that of the end of the hollow plunger C of Fig. 1. This instrument is intended for use with a plug without a long stem or thread and in use the plug is inserted between the jaws J as in Fig. 2 and the spindle I being turned in the screwed head or nut $H'$ the wedge-shaped edge of the jaws J is drawn into the tube H thus compressing the jaws so that they hold the plug firmly. After the plug has been inserted the head $I^2$ can be turned and the rod I screwed back again through the nut $H'$ when the jaws J will release their hold upon the plug and the instrument can be withdrawn.

In Figs. 17 and 18 is shown a simple insertion tool consisting of the tube B pointed at its forward end and the pointed and headed plunger K which with the pointed end of the tube B forms a complete cone which may be readily inserted through the puncture in the tire; after the tube B has been inserted the plunger K may be withdrawn and replaced by the hollow plunger C which is generally similar to the hollow plunger C of Fig. 1 although in this instance it is shown much shorter. After the hollow plunger C carrying the plug E and solution has been inserted the tube B can be withdrawn and the operations with the hollow plunger C are the same as those described in reference to Fig. 1.

In Fig. 19 is shown a modification of the hollow plunger C adapted for inserting double-headed plugs E $E^2$ $E^3$; this plunger C is split at the end in a manner similar to that described in reference to Fig. 15 so as to facilitate the insertion of the plug into it; the operation with this instrument is the same as with Fig. 1 the tube B preventing the split end from opening and releasing the plug until the tube B has been withdrawn after which the plunger C can be removed leaving the plug and solution in their proper position in the tire as before. The head $E^3$ is merely for convenience in handling and can be cut off with the projecting portion of the same after the plug has been fixed.

In Fig. 13 a modified arrangement for the introduction of the plug is shown; in this figure L represents a tube shown with a bell-mouth though this is not essential and the plug E is shown with an enlarged head the flange or projecting rim of which may be doubled over the end of the tube L as shown at L' where it may be secured by tying or merely held in position. It is desirable to use the bell-mouth to the tube L as the solution can then be placed in the space $L^2$ behind the bell-mouth between the tube and the flange of the plug. The tube L is withdrawn when the plug has been passed through the tire and the end can be cut off as in former instances. The plug may be retained in the tube L during the operation either by means of its stem or cord E' which may be passed through the tube L or it may be tied round at L' as above described, or the funnel-shaped ring M may be employed; this serves to compress the flange and draws off and remains outside as the plug is forced through the rubber. In this arrangement the pointed end of the head of the plug E enables it to be forced through the puncture the conical neck illustrated taking a good bearing upon the bell or conical mouth of the tube; nevertheless the pressure is generally not so great that damage would result to the plug even were the bell-mouth and conical neck dispensed with. The solution may be forced into the puncture first and may also be used to lubricate the plug in its passage through the opening.

In the arrangement illustrated in Figs. 21 to 23 the tool is formed in two parts the tube B which has a head $B^2$ being screwed at its leading end to facilitate the insertion and holding of the tool. The plunger N has a pointed screw-thread upon it at its leading end to facilitate its entrance into the puncture in the tire and has also a head N' and pin $N^2$ the latter to engage with a hole $B^3$ in the head $B^2$ of the tube B. With this arrangement the plunger N which passes freely through the tube B is screwed into the aperture its tapered point facilitating the introduction of the end of the threaded tube B and the pin $N^2$ causing the two to work together. After the tube B is inserted as in Fig. 23 the plunger N is withdrawn and the plug may then be forced through the opening $B^4$ into the inside of the tube by any suitable plunger.

The tool O shown in Fig. 24 consists of a piece of bent steel wire with a knife-edge O' formed upon it; this tool may be inserted through the aperture and then turned round for the purpose of removing the deposit of sulphur around the hole upon the inside of the tube.

I have described the employment of a head to the plugs but it will be understood that if a conical plug be employed it may be made sufficiently firm without the necessity for any special head particularly so if the hole or aperture be larger upon the inside of the tire than upon the outside.

It will be seen that the instruments hereinbefore described are suitable for operating directly upon the puncture in the tire the point being inserted in the puncture which is then expanded for the passage of the plug. It will be readily understood however that a much more satisfactory stoppage of the leak will be effected if a circular hole corresponding and adapted to closely engage with the plug be formed, and especially so if the hole be tapered and have its larger end at the inner or inaccessible side of the tire. It is therefore desirable that the hole or puncture should be enlarged and tapered so as to suit the plug especially so since by this arrangement a hole of a known size can be produced in which the plug will tightly fit. For this purpose I employ the instrument whose construction and operation are illustrated in Figs. 25 to 31 of the accompanying drawings.

The instrument illustrated in Figs. 25 and 26 consists of a stock or barrel P preferably of hard wood through which passes the rod Q having on its end outside the stock the head Q' pointed at its outside end and recessed at its other end so as to produce a circular cutting edge $Q^2$. The spring $Q^3$ Fig. 26 is carried in the hollow interior of the stock P and compressed between the stock and the button or handle $Q^4$ fixed upon the rod Q the tendency thus being to press the cutting edge $Q^2$ against the end of the stock P as indicated in Fig. 26. In use the point of the head Q' is inserted into the puncture and the button $Q^4$ pushed in until the whole of the head Q' is inside the tire as indicated in Fig. 27 the requisite space between the cutting edge $Q^2$ and the end of the stock P being obtained by pushing in the button $Q^4$ so that the neck $Q^5$ compressing the spring $Q^3$ slides into the stock P. The next operation is shown in Fig. 28 where the cutter $Q^2$ has cut out a circular piece of the tire and is ready to be withdrawn.

The cutting operation may be conveniently effected by turning the button $Q^4$ round and round or backward and forward, the spring $Q^3$ forcing the cutting edge upon the tire and compressing it between the cutting edge $Q^2$ and the end of the stock P. The hole obtained is shown in Fig. 29 the orifice upon the inside of the tire being considerably larger than the orifice upon the outside of the tire. The piece of rubber cut out remains round the rod Q from which it may be removed by compressing the spring $Q^3$ withdrawing the piece of rubber from the interior of the head $Q'$ and cutting it off the rod Q. Before commencing the hollow in the head $Q'$ may be filled with water to act as a lubricant during the cutting operation. It appears to be a natural effect upon the rubber that the hole would be larger at that side at which the cutting commences but to accentuate this feature the cutting tool $Q^2$ may be swelled out as shown in the drawings so as to be of larger diameter above the cutting edge than it is at the cutting edge.

The instrument shown in Figs. 30 and 31 is a modification of that shown in Figs. 25 and 26; in this case the general features are the same but the rod Q is thickened and screw-threaded at $Q^6$ and provided with a turning button or handle $Q^7$ the screw thread $Q^6$ engaging with a corresponding thread in the stock P which in this instance serves also as a nut. The block R against which the cutting is effected may in this case be either part of the stock P or as shown in the drawings a separate portion. Where the pressure is applied by the operation of the screw in the nut P as the rod Q is revolved the portion R may be fixed to P; but where it is desired to apply the pressure by hand the block R may be independent of P which may either be dispensed with altogether or allowed to turn round with the rod Q. It will be therefore seen that in both instruments Figs. 30 and 31 and 25 and 26 the pressure may if desired be applied by hand the screw and spring being provided for convenience. Both the stocks P and the cutting block R may be provided with lugs for convenience in holding as shown in the figures.

Instead of the head $Q'$ being the cutter and P or R the block the parts may be reversed, and P be made the cutter and $Q'$ the block.

I claim,—

1. The described method of stopping a hole or leak in an elastic cycle tire or other article whose interior is inaccessible excepting through said hole or leak, consisting in expanding or enlarging the hole against the resiliency of its walls, secondly inserting a headed plug therein and finally allowing the opening to contract outside of the head of the plug; substantially as described.

2. The improved pneumatic tire repairing means consisting of the hollow expander for entering the puncture and enlarging the same against the resiliency of its walls and the headed plug or stopper carried in the hollow of the expander and adapted to be discharged with the head within the tire; substantially as described.

3. The improved pneumatic tire repairing means consisting of the hollow expander for entering and temporarily enlarging the puncture in combination with a tube working within said expander and a headed plug carried by the tube and adapted to be discharged from the expander with its head within the tire; substantially as described.

4. In a tool for the stoppage of leaks or closing of apertures in indiarubber tires and the like which are only accessible from one side the combination with a number of spring fingers such as A coming to a point as at $A'$ of a tube such as B adapted when pushed forward to separate the said fingers and a plunger such as C substantially as and for the purpose described and illustrated in the accompanying drawings.

5. In a tool for the stoppage of leaks or closing of apertures in indiarubber tires and the like which are only accessible from one side the combination with a tube such as B adapted to enter the aperture to be closed of a plunger such as C having a peripheral recess as at $C^3$ adapted to receive and carry the solution for fixing the plug to the inner or inaccessible side of the material to be repaired substantially as described and illustrated in the accompanying drawings.

6. The process of repairing a leak or aperture in a rubber or other article accessible only from one side which consists in placing in a suitable instrument a plug such as E passing it together with the fixing solution through the temporarily enlarged opening which has to be closed withdrawing the instrument or means by which the hole was enlarged and drawing back the plug until its head or enlarged portion engages with the material substantially as described and illustrated in the accompanying drawings.

7. The herein described method of repairing punctured pneumatic bicycle tires, consisting in cutting out the punctured portion from the inside thereby forming a frusto conical opening with its base or larger portion inside, and filling said opening with a headed plug, whereby the plug is forced into more intimate contact with the tapering walls of the aperture by the internal air pressure; substantially as described.

8. In an instrument for cutting holes from the inaccessible side of cycle tires and the like accessible from one side only the combination with a stock such as P of a pointed cutting head such as $Q'$ $Q^2$ adapted to pass through the material and cut from the inaccessible side of the material and to be operated from the accessible side thereof substantially as described and illustrated in the accompanying drawings.

9. In an instrument for cutting holes from the inaccessible side of cycle tires and the like accessible from one side only a cutting head such as $Q'$ $Q^2$ adapted to first pass through the puncture and then remove the portion of the material containing the puncture substantially as described.

10. An instrument for cutting holes from pneumatic tires, &c, from the outside, consisting of the co-operating cutting members, one having a pointed end adapted to pass through the puncture and the other forming a tubular stock through which an operating rod for the first mentioned member passes; substantially as described.

11. In an instrument for cutting holes from the inaccessible side of cycle tires and the like accessible from one side only the combination with the cutting head $Q'$ $Q^2$ and screwed rod or spindle $Q$ $Q^6$ of a stock or nut such as P substantially as and for the purpose described.

12. In an instrument for cutting holes from the inaccessible side of cycle tires and the like accessible from one side only the combination with a cutting head such as $Q'$ $Q^2$ and rod or spindle Q of a cutting block such as R substantially as described.

13. A new article of manufacture consisting of a plug of flexible material having an enlarged head at one end thereof and a string or stem at the other end for the purpose of repairing pneumatic tires substantially as described.

14. A new article of manufacture for repairing pneumatic tires and the like consisting of a disk of flexible rubber having a string or stem from the center of one side thereof substantially as and for the purpose described and illustrated in the accompanying drawings.

15. A device for closing punctures in pneumatic tires, &c., consisting of a plug having a pointed end and substantially flat inner surface with a stem or cord extending out from said inner surface for seating the same against the inside of the tire; substantially as described.

16. A plug of indiarubber consisting of a stem and a mushroom shaped head the concave or inner side of which is plain and the convex or outer side of which has ribs radiating from the center for the purpose of preventing the head from turning inside out.

17. A plug for stopping or repairing holes in indiarubber or other articles consisting of a stem and a mushroom shaped head the under or concave side of which has circular ridges or corrugations and the outer or convex side of which is honeycombed cellular or ribbed substantially as and for the purpose described and illustrated in the accompanying drawings.

18. A new or improved article of manufacture consisting of a mushroom shaped plug for stopping or repairing holes in indiarubber or other articles (the interior of which hole is only accessible through the hole itself) such plug having its outer or convex side honeycombed or cellular for the purpose of allowing the head to be compressed and also for the purpose of preventing the head of the plug from turning inside out substantially as described.

19. A plug for stopping or repairing holes in indiarubber or other articles having a stem and a mushroom shaped corrugated head substantially as described and illustrated in the accompanying drawings.

20. An improved device for closing punctures in pneumatic tires consisting of the mushroom shaped plug having the substantially circular ribs on its inner surface; substantially as described.

In testimony whereof I have hereto set my hand in the presence of the two subscribing witnesses.

THOMAS BEAVAN SLOPER.

Witnesses:
 HARRY B. BRIDGE,
 C. ROSE.